F. C. KISTLER.
ICE CREAM CONE FILLER.
APPLICATION FILED APR. 25, 1917.

1,279,553.

Patented Sept. 24, 1918.

Witness

Inventor
F. C. Kistler
By
Attorney

UNITED STATES PATENT OFFICE.

FRANK C. KISTLER, OF GREENSBURG, PENNSYLVANIA.

ICE-CREAM-CONE FILLER.

1,279,553.

Specification of Letters Patent. Patented Sept. 24, 1918.

Application filed April 25, 1917. Serial No. 164,458.

*To all whom it may concern:*

Be it known that I, FRANK C. KISTLER, a citizen of the United States, residing at Greensburg, in the county of Westmoreland and State of Pennsylvania, have invented a new and useful Ice-Cream-Cone Filler, of which the following is a specification.

The present invention relates to an ice cream cone filler, and aims to provide a device of that character of novel and improved construction for quickly and conveniently filling ice cream cones without danger of breaking them, the device operable for holding the cone into which the ice cream is scooped directly, and means being provided for lifting the cone out of the holder.

The present invention resides in the provision of a holder for the cones and novel means for raising or ejecting the cone after being filled, the device being readily manipulated and embodying a novel assemblage of the component elements to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
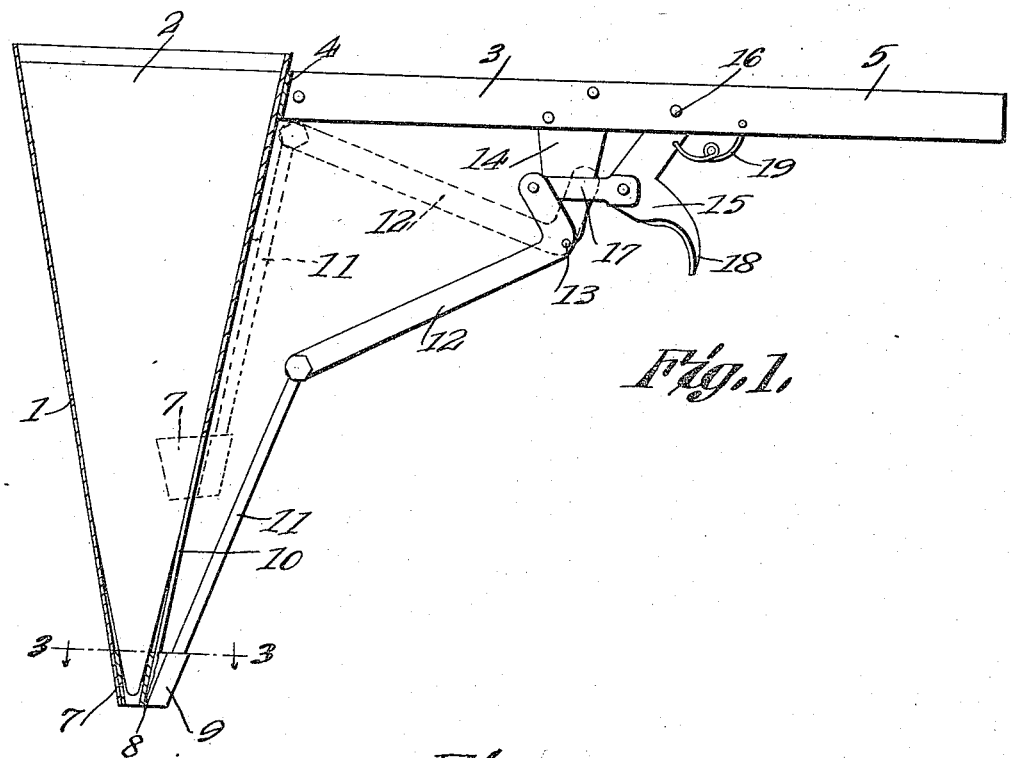
Figure 1 is a side view, partly in elevation, and partly in section, of the holder.
Figure 2:
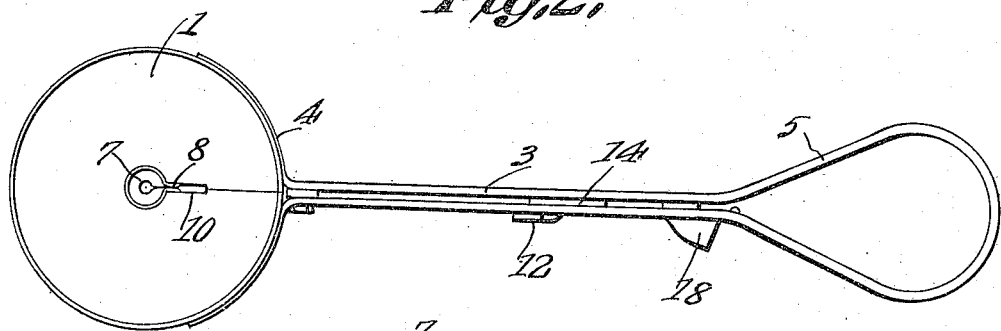
Fig. 2 is a plan view thereof.
Figure 3:
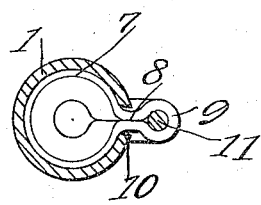
Fig. 3 is a sectional detail on the line 3—3 of Fig. 1.

The device embodies a holder 1 constructed of sheet metal or other suitable material and of conical or tapered form to snugly receive the ice cream cone 2. The holder is of such length that its larger end extends beyond the larger end of the cone 2, whereby to engage the cream or other material, when the device is used as a scoop, to direct the cream into the cone without injuring the edge thereof. The smaller end of the cone is open to let any stray particles of cream pass therethrough, to avoid clogging, and thus keep the interior of the holder clean in order that the cone can seat snugly therein.

The handle for manipulating the holder is formed from a bar or strip of metal doubled upon itself and bent to provide the slotted shank 3 having the divergent terminals 4 riveted or otherwise secured to the holder 1 adjacent to the larger end thereof, with the shank extending substantially at right angles to the axis of the holder. The free end of the shank 3 is provided with a loop-shaped hand hold 5 adapted to be grasped in the hand for handling the device without the hand touching the cone or parts contiguous thereto.

The cone ejecting means embodies an ejector movable within the holder 1 and having the loop 7 movable along that side of the holder to which the handle is attached. The ejector has the web 8 extending from the loop 7 and the socket portion 9 carried by the web 8 outside of the holder. The web 8 is slidable within a longitudinal slot 10 with which said side of the holder is provided and extending to the smaller open end of the holder. The ejector is thus guided along said side of the holder longitudinally thereof, and when the ejector is at the lower smaller end of the holder, the tip of the cone will fit in the loop 7, as seen in full lines in Fig. 1.

As a means for raising the ejector for moving it toward the larger end of the holder, a rod or stem 11 has its lower end soldered or otherwise secured within the socket portion 9, and its upper end is pivoted to the free end of the long arm of a bell crank or L-shaped lever 12 which has its elbow pivoted, as at 13, to a rigid hanger 14 riveted or otherwise secured between the sections of the shank 3 between the ends thereof. Said long arm of the lever 12 projects toward the holder 1, and the short arm thereof projects upwardly and is connected by a link 17 with the elbow of an angular or L-shaped lever 15 which has one arm extending upwardly and pivoted, as at 16, within the shank 3. The other free arm of the lever 15 extends away from the holder 1 and is bent into a finger piece 18, whereby the hand which grasps the hand hold 5 can be readily moved to raise the finger piece 18 and swing the lever 15 to pull the link 17. A wire spring 19 connects the lever 15 and shank 3 to normally swing the lever 15 toward the holder 1, whereby to push the link 17 likewise. This will swing the lever 12 downwardly to move the rod 11 likewise, thereby moving the ejector to the lower end of the holder 1 for the reception of the cone in the holder with its tip entering the loop or receptacle 7 of the ejector. When the cone is placed in the holder, the holder can be readily manipulated to scoop the ice cream or other material into the cone, and then by swinging the lever 15 through the medium of the finger piece 18 upwardly toward the handle, against the tension of the spring 19, this will pull the link 17 and swing the lever 12 upwardly to raise the rod 11 and ejector, as seen in dotted lines in Fig. 1. The tip or smaller end of the cone being raised with the ejector, will lift the cone partially out of the holder, in order that it can be readily taken therefrom, by the purchaser if desired.

Both ends of the holder being open will enable it to be readily cleaned, and also permit stray particles of cream to pass therethrough.

Having thus described the invention, what is claimed as new is:—

An ice cream cone filler including a cone holder having a longitudinal slot, a handle fixedly connected to the holder, a cone receiving ejector within the holder, a web extending therefrom and through the slot and having a socket, a spring restrained lever pivotally connected to and extending downwardly from the handle and having a finger portion, a bell crank lever supported by the handle, a link connection between one end of the bell crank lever and an intermediate portion of the spring restrained lever, and a rod connection between the other end of the bell crank lever and the socket end of the web.

In testimony that I claim the foregoing as my own, I have hereto affixed my signature in the presence of two witnesses.

FRANK C. KISTLER.

Witnesses:
GEO. E. BARRON,
A. C. REMALEY.

Copies of this patent may be obtained for five cents each, by addressing the "Commissioner of Patents, Washington, D. C."